US009708212B2

(12) United States Patent
Suffner (10) Patent No.: US 9,708,212 B2
(45) Date of Patent: Jul. 18, 2017

(54) SODIUM-RESISTANT JOINING GLASS AND THE USE THEREOF

(71) Applicant: SCHOTT AG, Mainz (DE)

(72) Inventor: Jens Suffner, Landshut (DE)

(73) Assignee: Schott AG, Mainz (DE)

( * ) Notice: Subject to any disclaimer, the term of this patent is extended or adjusted under 35 U.S.C. 154(b) by 408 days.

(21) Appl. No.: 14/526,672

(22) Filed: Oct. 29, 2014

(65) Prior Publication Data

US 2015/0146840 A1 May 28, 2015

(30) Foreign Application Priority Data

Nov. 26, 2013 (DE) .................. 10 2013 224 111

(51) Int. Cl.
| | | |
|---|---|---|
| *C03C 3/091* | (2006.01) | |
| *C03C 8/24* | (2006.01) | |
| *F16B 11/00* | (2006.01) | |
| *G21C 13/02* | (2006.01) | |
| *H01M 2/08* | (2006.01) | |
| *H02G 3/22* | (2006.01) | |
| *C03C 3/093* | (2006.01) | |
| *C03C 8/02* | (2006.01) | |
| *C03C 8/04* | (2006.01) | |
| *G21C 1/02* | (2006.01) | |
| *H01M 10/39* | (2006.01) | |

(52) U.S. Cl.
CPC .............. *C03C 8/24* (2013.01); *C03C 3/091* (2013.01); *C03C 3/093* (2013.01); *C03C 8/02* (2013.01); *C03C 8/04* (2013.01); *F16B 11/00* (2013.01); *G21C 13/02* (2013.01); *H01M 2/08* (2013.01); *H02G 3/22* (2013.01); *C03C 2204/00* (2013.01); *C03C 2205/00* (2013.01); *G21C 1/02* (2013.01); *H01M 10/39* (2013.01); *Y02E 30/40* (2013.01); *Y10T 29/4911* (2015.01); *Y10T 403/477* (2015.01)

(58) Field of Classification Search
CPC ......... C03C 3/091; C03C 3/083; C03C 3/085; C03C 3/087
USPC ......................................... 501/66, 68, 69, 70
See application file for complete search history.

(56) References Cited

U.S. PATENT DOCUMENTS

| | | | |
|---|---|---|---|
| 4,268,313 A | 5/1981 | Park et al. | |
| 4,349,635 A | 9/1982 | Davis et al. | |
| 5,175,067 A | 12/1992 | Taylor et al. | |
| 5,194,337 A | 3/1993 | Yoshida et al. | |
| 5,962,160 A * | 10/1999 | Oyama | C22C 19/058 429/104 |
| 7,214,441 B2 * | 5/2007 | Cortright | C03C 3/064 429/495 |

(Continued)

FOREIGN PATENT DOCUMENTS

| | | | | |
|---|---|---|---|---|
| DE | 10122327 A1 * | 11/2002 | ............. | C03C 10/00 |
| EP | 0459674 | 12/1991 | | |

(Continued)

*Primary Examiner* — Noah Wiese
(74) *Attorney, Agent, or Firm* — Michael J. Striker (57) ABSTRACT

The sodium-resistant joining glass (1) is substantially free of $ZrO_2$ and is based on a $SiO_2$—$B_2O_3$—$Na_2O$—$Al_2O_3$ glass system. It is suitable for producing a joint of a metal and/or ceramic component with a further joining component (2, 3, 4) using the joining glass (1). Feedthrough-devices (20) using the joining glass (1) as fixing material are also disclosed.

28 Claims, 4 Drawing Sheets

(56) References Cited

U.S. PATENT DOCUMENTS

| | | | |
|---|---|---|---|
| 8,034,457 B2* | 10/2011 | Wu | C03C 8/02 |
| | | | 428/428 |
| 8,043,986 B2* | 10/2011 | Park | C03C 3/064 |
| | | | 429/139 |
| 8,334,053 B2 | 12/2012 | Shapiro et al. | |
| 8,741,792 B2 | 6/2014 | Akamatsu et al. | |
| 2010/0120602 A1 | 5/2010 | Park et al. | |

FOREIGN PATENT DOCUMENTS

| | | |
|---|---|---|
| EP | 0 482 785 | 4/1992 |
| GB | 2 207 545 | 2/1989 |
| JP | 49-96783 | 9/1974 |
| JP | 3-55768 | 3/1991 |
| JP | 58-501767 | 10/1991 |
| JP | 4-26565 | 1/1992 |
| JP | 4-187571 | 7/1992 |
| JP | 2009-46380 | 3/2009 |
| JP | 2011-168480 | 9/2011 |
| WO | WO 83/01442 | 4/1983 |
| WO | WO2011/105519 | 9/2011 |

* cited by examiner

SODIUM-RESISTANT JOINING GLASS AND THE USE THEREOF

CROSS-REFERENCE TO RELATED APPLICATIONS

The invention described and claimed herein below is also described in German Patent Application 10 2013 224 111.9, which was filed on Nov. 26, 2013 in Germany. The aforesaid German Patent Application provides the basis for a claim of priority of invention for the invention described and claimed herein below under 35 U.S.C. 119 (a) to (d).

BACKGROUND OF THE INVENTION

The invention relates to sodium-resistant joining glasses, which can be used to produce joints with ceramics, for example alumina (also referred to as $Al_2O_3$, alumina ceramic or $Al_2O_3$ ceramic), and/or with metals and/or combinations of both. The invention as well relates to the application of the sodium-resistant joining glasses. Sodium-resistant joining glasses are joining materials which can withstand in particular liquid sodium and/or sodium vapour and in this way are suitable for the production of joints which are exposed, for example, to liquid sodium and/or sodium vapour and/or other aggressive sodium compounds and/or sodium-containing media.

Sodium-resistant joining glasses of this type are of interest, for example, for the production of energy storage and energy generation units, in which liquid sodium and/or sodium compounds are used as the electrolyte or cooling medium. Examples of such energy generation units are electrochemical cells such as batteries as well as nuclear reactors, especially within the class of Fast Breeder Reactors, Fast Neutron Reactors, Sodium-Cooled Fast Reactors and/or Liquid Metal Fast Breeder Reactors. The joining glasses useable in those reactors could be advantageously applied in technical components within and/or connected to those reactors and being in contact with said sodium and/or sodium compounds. Examples of such technical components are especially feedthrough-devices, which are used to supply sensors and/or actuators and/or electric motors e.g. in electric pumps with electrical power and/or steering signals. Another application area of the sodium-resistant joining glasses being subject to this invention are installations for the disposal of toxic materials, in which sodium compounds and/or sodium vapour and/or liquid sodium might be produced within the process.

Especially the electrochemical storage and energy generation technology has gained considerable interest in recent years. It can be employed in this respect in the field of electromobility, for local power supply, as an emergency power system and, primarily on account of the increased shares of renewable energies, for stabilizing the network system.

Various battery technologies are under discussion here, with the Li-ion batteries (LIB) being those which are discussed to the greatest extent. A further class of batteries is represented by the high-temperature sodium batteries (Sodium Beta Battery, SBB). The advantages thereof over the LIB are the higher energy density and high energy efficiency. The SBB uses liquid sodium as the negative electrode at elevated temperatures, usually of more than 250° C. A distinction is made in general terms between two variants: one is the sodium-sulphur battery (Na/S), which uses sulphur as the positive electrode. The other is the sodium-metal chloride battery, also referred to as ZEBRA® battery, which uses metal chlorides such as nickel or iron chloride as the positive electrode and sodium tetrachloroaluminate ($NaAlCl_4$) as the liquid electrolyte. Both types have the common feature that they use a sodium ion-conducting membrane consisting of β- or β"-$Al_2O_3$ and a housing part consisting of α-$Al_2O_3$, and the latter can if appropriate additionally be connected to a metallic cover.

The generic term "alumina" used in the present description, or synonymously alumina ceramic or synonymously $Al_2O_3$ or likewise synonymously $Al_2O_3$ ceramic, includes in particular the embodiments α- and/or β- and/or β"-alumina. The use of the term "alumina" also does not signify any limitation to the degree of purity and therefore the content of $Al_2O_3$ in the $Al_2O_3$ ceramic and/or the component in question.

The joint between the components made of ceramic, in particular alumina, or a further metal component represents a critical component in an electrochemical cell, since it determines the service life. If leakages occur in this region, the liquid sodium can come into contact with the atmosphere and begin to burn. The object of the joining glass as the joining material here is to achieve a hermetically tight join which lasts for the entire service life of the battery. This can be achieved in particular by a good adaptation of the coefficient of thermal expansion of all the materials involved, which makes the joint tolerant to the operating states, and also a very good chemical resistance of the glass to all active components, without impairing the function thereof.

A distinction is made between two fundamental types of joining glasses for batteries: silicate-based glasses and borate-based glasses. Borate-based glasses have the advantage that they usually have a very good resistance to the molten sodium, but they have poorer properties in terms of their chemical resistance to the metal chloride. In addition, the aluminoborates which are frequently used often only have a low stability against crystallization, and this limits them from the viewpoint of process control. A special form is specified, for example, in U.S. Pat. No. 8,334,053 B2, which describes separate glasses depending on corrosion resistance on anode and cathode of an SBB. According to said document, a glass with a high silicon content comprising more than 40% by weight $SiO_2$ and less than 25% by weight $B_2O_3$ is used on the metal salt side, and a borate glass with a very low silicon content of less than 20% by weight $SiO_2$ and more than 35% by weight $B_2O_3$ is used on the sodium side.

GB 2207545 A describes the use of a borosilicate glass 8245 from Schott AG as a joining glass for a Na/S battery. This glass has a very good chemical stability with respect to the media of the Na/S battery, but can only be hermetically joined durably to a limited extent with alumina owing to the low coefficient of linear thermal expansion $\alpha_{20\text{-}300°\ C.}$ of $5.2 \cdot 10^{-6}\ K^{-1}$.

U.S. Pat. No. 4,268,313 A describes a borosilicate glass for use in an Na/S battery. However, this glass comprises in total at least 6% by weight of the alkaline earth metal oxides CaO, SrO and BaO. These components are beneficial to the glass formation and can improve the flow behaviour, but can reduce the performance of the active components by ion transfer with the electrolyte, in particular of an SBB.

A joining glass containing at most 25% by weight $B_2O_3$ for an energy storage device is described in U.S. Pat. No. 8,034,457 B2. The limitation of the content of $8_2O_3$ to said upper limit is explained by the fact that the joining glass would otherwise be subjected to excessive attack by adsorbed water.

U.S. Pat. No. 8,043,986 B2 includes a joining glass for an SBB comprising at least 0.1 to 10% by weight $ZrO_2$. Zirconium oxide is used in this document for improving the chemical resistance. However, it also leads to a greater tendency toward phase separation and crystallization and also, on account of the high raw material costs, to a reduction in the efficiency of the glassmaking process.

SUMMARY OF THE INVENTION

Against this background, it is an object of the present invention to provide a joining glass which is suitable for producing joints with metals and/or ceramics which have a very good resistance to molten metal salts and to sodium melts, liquid sodium and/or sodium vapour and/or aggressive sodium compounds. Suitable ceramics to be joined are, in particular, alumina and/or NASICON (sodium super ionic conductor) and suitable metals are especially steel and/or alloys.

It is a further object of the invention to provide a joint for ceramics, in particular alumina and/or NASICON, by means of the joining glass and also to provide electrochemical energy storage and/or energy generation units comprising the joining glass as well as to provide electrical feedthrough-devices comprising the joining glass as electrically insulating fixing material, which profit from the properties of the joining glass and therefore have improved properties.

The object is achieved by the joining glass, the joint, the electrochemical energy storage and/or energy generation unit or units comprising the joining glass, and the feedthrough-device and the use as per the claims. Preferred embodiments become apparent from the claims which depend on the main claim.

Herein below, unless explicitly specified otherwise, all information relating to components and/or contents is provided in % by weight based on oxide content.

A joining glass according to the invention comprises 40% to 50% $SiO_2$ and more than 25% up to 30% $B_2O_3$. This combination influences, in particular, the coefficient of thermal expansion and at the same time controls the flow behaviour. According to the invention, the joining glass furthermore contains 5% to 15% $Na_2O$ and 17% to 25% $Al_2O_3$. These components can be used to set, in particular, the good chemical resistance of the joining glass.

The joining glasses according to the invention comprises, optionally and in total, less than 2% alkaline earth metal oxides MO. MO represents CaO, SrO and/or BaO, which can be present in the joining glass individually or in any possible combination up to said limits of the total content. Alkaline earth metal oxides can have a positive effect on the flow behaviour of the glasses. Since they can reduce the performance of one of the active components through diffusion or ion transfer with the sodium ions of the electrolyte, the content thereof is reduced to a minimum according to the invention.

Furthermore, the joining glass according to the invention is free of $ZrO_2$, except for at most impurities. Impurities can be incorporated in the glass by contamination of the raw materials used for the glassmaking and/or by contamination and/or corrosion of the melting units used. Impurities of this nature generally do not exceed a proportion of 0.2% by weight, in particular 0.1% by weight. This of course also includes the complete freedom from $ZrO_2$. Contrary to the teaching in the cited prior art, it has been found that the joining glasses according to the invention have a very good chemical resistance, even though $ZrO_2$ has been dispensed with to improve the chemical resistance. In addition, it has been found that $ZrO_2$ can act as a crystallization nucleus, which promotes the crystallization during processing. Crystallization (including partial crystallization) of the joining glass according to the invention is undesirable, since the crystalline regions lead to difficulties in the production of the joint and/or can even cause leakages in the joint. The joining glass according to the invention is therefore particularly advantageously an amorphous glass, in particular without crystallized regions.

Tests carried out on the joining glasses have shown that, contrary to the cited prior art, it was not possible to establish hydrolytic ageing given increased contents of $B_2O_3$ of more than 25%. Instead, the inventors found that a higher boron content of more than 25% to 30% surprisingly even increases the resistance to sodium melts. Owing to the aforementioned composition, the joining glasses according to the invention can advantageously be melted in a manner free from crystallization and segregation.

In a preferred embodiment, a joining glass according to the invention comprises up to 5% ZnO and/or up to 5% $TiO_2$ and/or up to 5% $SnO_2$ and/or up to 15% MgO. These optional additional components can be present individually or in any desired combination in the joining glass. These components bring about in particular an improvement in the chemical resistance in the alkaline range. MgO is an optional component and might be comprised in the joining glass in order to adapt the thermal expansion of the joining glass to the joining partner. Usually an increased content of MgO leads to an increased coefficient of thermal expansion. The invention also foresees that MgO might be advantageously contained in the joining glass from 0-<2%.

It is particularly preferable that the composition of the joining glass is selected within the limits indicated above such that the coefficient of linear thermal expansion $\alpha_{20-300°\,C.}$ in the temperature region from 20° C. to 300° C. of the joining glass has values of $5.5 \times 10^{-6}$ $K^{-1}$ up to $10.5 \times 10^{-6}$ $K^{-1}$ or even preferably from $5.5 \times 10^{-6}$ $K^{-1}$ up to $8.5 \cdot 10^{-6}$ $K^{-1}$, very particularly preferably of $6.0 \cdot 10^{-6}$ $K^{-1}$ up to $8.0 \cdot 10^{-6}$ $K^{-1}$. This achieves in particular an adaptation of the joining glass to the thermal expansion behaviour of alumina:

It can likewise be preferable for the joining glass to additionally contain up to 30% by volume of an oxidic filler, in particular of an inorganic oxide. These fillers can be used in particular for setting the thermal expansion behaviour and/or the corrosion resistance and/or the flow behaviour, the filler preferably being present in the form of particles and/or fibres. Examples of such fillers are MgO, $Al_2O_3$ and/or stabilized $ZrO_2$. Those can be especially applied in order to adapt the thermal expansion of the joining glass and filler mixture to the thermal expansion of the metal joining partner. The filler materials usually are not part of the glass matrix, but are usually embedded therein as isolated component.

The invention likewise encompasses a joint between a first joining component and a second joining component by means of a joining glass described above. A joining component is understood to mean any element which is connected with the joining glass. The joining glass in this case enters in particular into an integral bond with the respective joining component. An integral bond is distinguished by the fact that the bonding partners, here the respective joining component with the joining glass, are held together by atomic or molecular forces. This gives rise to non-releasable bonds which can only be separated by the destruction of the bonding means, here the joining glass.

It is particularly advantageous that the joining glass is able to provide a hermetically tight joint between the joining components as the joining partners.

The joint between the joining components is produced by the joining glass and is accordingly present at the joining area of the respective joining component which is bonded with the joining glass. The joining area is accordingly the region on the surface of the respective joining component which is in contact with the joining glass. The joining component can be bonded over its entire surface area, but also in any desired regions, to the joining glass and via the latter to the other joining component. As described, the joining glass according to the invention is especially suitable for joining ceramics and/or metals. Accordingly, a joint according to the invention provides that the first joining component comprises a ceramic or a metal part at least at the joining area. The second joining component likewise comprises a ceramic or a metal at least at the joining area. Combinations of metal and ceramic are of course similarly possible and are encompassed by the invention. In combination, this means as well that the second joining component can be a hybrid component composed of metal and ceramic in the region of the joint. With other words and potentially simplified, the joining glass according to the invention provides joints between metal to metal or between ceramic to metal or between ceramic to ceramic or between metal or ceramic to a hybrid component comprising metal and ceramic.

As described, the joining glass according to the invention is suitable in particular for joining alumina, and therefore it provides a joint according to the invention in which the first joining component comprises alumina, in particular consists of alumina, at least at the joining area. The second joining component comprises a metal and alternatively or in combination alumina at least at the joining area. In combination, what is obtained is in particular a joining component in the form of a hybrid component composed of metal and alumina in the region of the joint.

It is preferable if the alumina of the first joining component comprises α-alumina or β-alumina or β"-alumina, in particular if it consists thereof. It is particularly preferable that the alumina of the second joining component, if it consists of or comprises alumina at least at the joining area, is likewise α-alumina or β-alumina or β"-alumina. This does not mean, however, that the embodiment of the alumina of the first joining component has to match the embodiment of the alumina of the second joining component; instead, it can be advantageous if the embodiments of the alumina in the first and second joining components are different, e.g. if the first joining component comprises α-alumina and the second joining component comprises β-alumina or β"-alumina. This configuration is used in particular in SBB and is of interest therefor.

It is similarly possible and preferable that the ceramic is selected, instead of alumina, from the class of NASICON (Na super ionic conductor) ceramics, typically of the $A_xB_y(PO_4)_3$ type with an alkali metal ion A (e.g. Na) and a multivalent metal ion B (e.g. Fe, Cr, Ti). All of the embodiments mentioned are also possible with these types of ceramic.

Similarly possible are joining components in housings of sensors and/or actuators, which are exposed to aggressive media, in particular liquid sodium or sodium salts. Possible fields of use for these can be found, for example, in the synthesis of liquid sodium by the electrolysis of salt melts and also in the field of the cooling of breeder reactors with liquid sodium.

As described, the second joining component similarly preferably comprises a metal at least at the joining area. It is particularly preferable that this metal has a coefficient of linear thermal expansion $\alpha_{20\text{-}300°\ C.}$ which (in the same temperature range) is greater than or equal to the coefficient of linear thermal expansion $\alpha_{20\text{-}300°\ C.}$ of the ceramic, in particular of the alumina.

It is particularly preferable that the value of the coefficient of linear thermal expansion $\alpha_{20\text{-}300°\ C.}$ of this metal is more than $8 \times 10^{-6}$ $K^{-1}$. Examples of such preferred metals are high-grade steels, low-carbon steels and/or nickel alloys.

The joint according to the invention makes it possible to produce electrochemical energy storage and/or energy generation units with an increased service life and/or increased efficiency. These are therefore likewise encompassed by the invention. Examples of electrochemical energy storage devices are storage batteries in charging mode, and examples of electrochemical energy generation units are batteries or storage batteries in discharging mode. Similarly possible are reactors for chemical and/or biochemical reactions, in which the energy state is represented by the respective oxidation and reduction state of the reagents and products. It is particularly preferable that an energy storage and/or energy generation unit according to the invention is a sodium-sulphur battery or sodium-metal chloride battery comprising a joint according to the invention.

The joint according to the invention as well facilitates the production of feedthrough-devices, especially electric feedthrough-devices.

An advantageous electric feedthrough-device comprises a metal carrier element, which is provided with a feedthrough-opening, and a metal functional element. The functional element is fixed within the feedthrough-opening by means of the described joining glass and electrically insulates the carrier element from the functional element. Thereby the feedthrough-opening is sealed, especially hermetically sealed.

The joining glass according to the invention is used with very particular preference for producing sodium-sulphur batteries or sodium-metal chloride batteries, in particular for hermetically sealing the housing thereof and/or for closing off and/or bonding the membrane components in the electrolyte cells thereof. The bond can also be made with suitable carrier elements, etc.

The feedthrough-device according to the invention can be most advantageously applied in installations for the disposal of toxic waste and/or nuclear reactors, especially fast breeding reactors. Therein the application as electrical feedthrough-device for the containment of the reactor and/or as electric feedthrough-device for the cooling circuit predominantly benefits from the capabilities of the joining glass and/or the joining connection as described herein. The cooling circuit can comprise the primary and/or the secondary cooling circuit, which use liquid sodium as cooling medium, especially in fast breeding reactors. The feedthrough-device might be exposed to liquid sodium and/or sodium vapour and must be capable to withstand such permanent exposure or exposure due to emergency state situations. This feedthrough-device might be used to supply, for example, electric pumps and/or sensors within the cooling circuit with electric current and/or to lead signals out of sensors applied within or at the cooling circuit. Another advantageous application of the feedthrough-device is within the containment of the reactor, in order to connect the inside of the containment with the outside without allowing harmful media to pass through. In this kind of application the feedthrough-device can be exposed to liquid and/or vaporized sodium especially in emergency situations, whereby it is of upmost importance that the feedthrough-device reliably seals the containment.

Another beneficial application area of the feedthrough-device are installations for the disposal of toxic waste, for example such in which waste is burnt or destructed chemically, whereby aggressive sodium compounds and/or liquid sodium and/or sodium vapour might occur within the process.

THE BRIEF DESCRIPTION OF THE DRAWING

The invention will be explained in more detail using figures, which are briefly described here. All of the figures are purely schematic; the dimensions of the actual objects can deviate from the dimensions and/or the proportions in the figures, in which:

FIG. 5b is a top view of a feedthrough-device according to FIG. 5a;

THE DESCRIPTION OF THE PREFERRED EMBODIMENTS

Figure 1A:
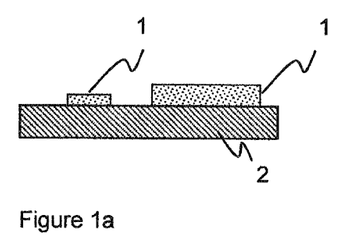
FIG. 1a is a cross-sectional view through a first joining component which is provided in certain regions with joining glass.

FIG. 1a schematically shows the section through a first joining component. The joining component (2) represents, so to speak, the substrate for the joining glass (1), which is located in certain regions on the surface of the joining component (2) and in these regions has entered into an integral bond with the joining component (2). The region at which the joining glass (1) is present can be the joining areas and are defined herein below as the joining areas at which joints with other joining components are produced. The joining component (2) shown with the joining glass (1) can produce joints with further joining components. In the present example, the joining component (2) consists of β-alumina or β"-alumina or NASICON. As described, it is similarly possible for the alumina (2) of the joining component to be present only at those joining areas at which the bond is produced using the joining glass (1), and for the remaining regions of the joining component to consist of different materials.

Figure 1B:
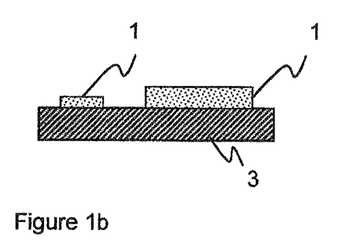
FIG. 1b is a cross-sectional view through another first joining component which is provided in certain regions with joining glass.

FIG. 1b shows substantially the same joining component with a joining glass as FIG. 1a, only that in this example the joining component (3) consists of α-alumina or comprises the latter at least at those joining areas at which the joining glass (1) is present. All further statements made in relation to FIG. 1b are also applicable to FIG. 1b.

Figure 2A:
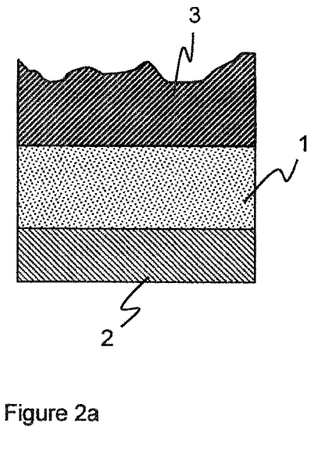
FIG. 2a is a cross-sectional view through a component assembly including a joint.

FIG. 2a shows the section through a joint which is formed by a component assembly, bonded by the joining glass (1), consisting of the first joining component (2) and the second joining component (3). As can be seen with reference to FIG. 2a, the object shown is in principle a combination of FIGS. 1a and 1b. In this figure, the material of the first joining component (2) is again β-alumina or β"-alumina and the material of the second joining component (3) is α-alumina. The joining glass (1) bonds integrally to the surfaces of the joining components (2, 3) at the joining areas and can thereby produce a hermetic and durable bond between the joining components (2, 3).

Figure 2B:
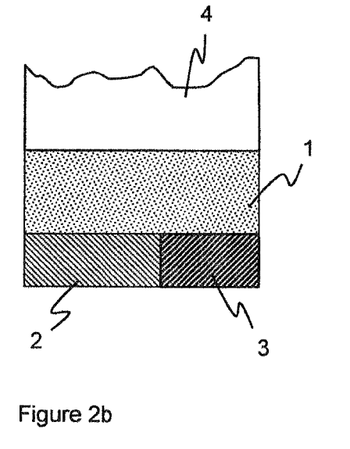
FIG. 2b is a cross-sectional view through another component assembly including a joint.

FIG. 2b shows the section through a similar embodiment to FIG. 2a, only that the first joining component is composed of β-alumina or β"-alumina (2) and α-alumina (3). In this exemplary embodiment, the second joining component (4) consists of a metal. It is clearly apparent to a person skilled in the art that a multiplicity of different overall components which can be adapted in accordance with the demands in relation to their use can be produced by appropriate combinations from the joints shown.

Figure 3:
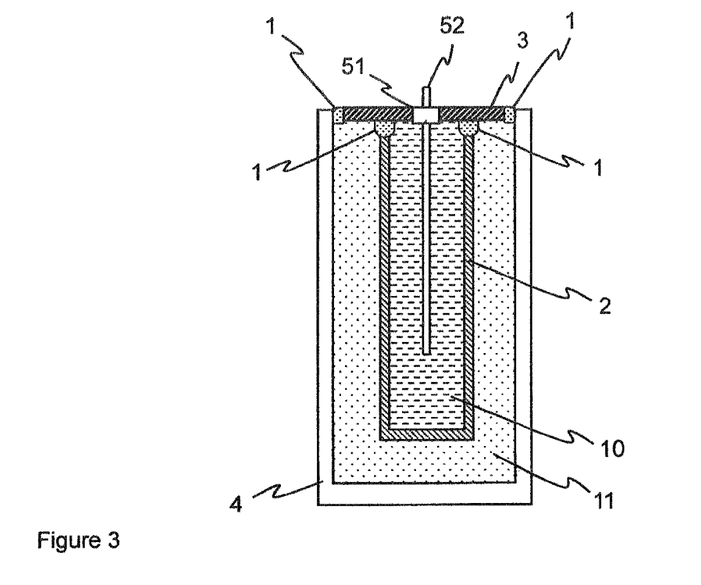
FIG. 3 is a cross-sectional view through a ZEBRA® battery.

FIG. 3 shows the section through a schematic ZEBRA® battery. The battery is closed off by the jar-shaped housing (4) and the cover (3). The housing (4) and the cover (3) are bonded to one another by the joining glass (1). The cover (3) represents, so to speak, the first joining component and the housing (4) represents, so to speak, the second joining component of the joint described above. In a ZEBRA® battery, the housing (4) usually consists of metal, e.g. of a high-grade steel, a nickel alloy or a low-carbon steel, and the cover (3) consists of alumina, in particular α-alumina. The joining glass (1) according to the invention reliably and durably produces a tight bond between the two joining components, cover (3) and housing (4), and therefore the contents of the ZEBRA® battery are closed off securely in the housing.

The hollow-cylindrical semi-permeable membrane (2), which is usually produced from β-alumina or β"-alumina, is located in the interior of the housing. The intermediate space between the inner wall of the housing (4) and the outer wall of the membrane (2) is filled by liquid sodium (11), which forms the anode. Through contact with the conductive housing (4), the latter similarly acts as the anode. The inner space of the hollow-cylindrical membrane (2) is filled, for example, with sodium tetrachloroaluminate as the electrolyte (10) and acts as the cathode. The semi-permeable membrane (2) consisting of β-alumina or β"-alumina is permeable only to Na ions. It is bonded to the cover (3) by the joining glass (1). Here, the membrane (2) represents, so to speak, the first joining component and the cover (3) represents the second joining component in the general principle of the joint as described above. In this joint at this region of the ZEBRA® battery, it is important that the joining glass (1) is impermeable to the electrolyte (10) and the liquid sodium (11), since otherwise electrolyte (10) and/or the liquid sodium (11) might be contaminated by the respective other substance, and accordingly the battery might be destroyed or at least the capacity thereof might be reduced.

In this example, the cover (3) itself is an electrical insulator, and therefore an electrode (52) is required in order to make it possible to connect the battery with anode and cathode to an electric circuit. In the present example shown in FIG. 3, the metal rod (52) penetrates through the cover (3) through the sleeve (51). At this point, it is likewise conceivable to guide the metal rod (52), or in general terms the electrode, through the cover (2) in a glass-metal feedthrough comprising the joining glass according to the invention.

Figure 4:
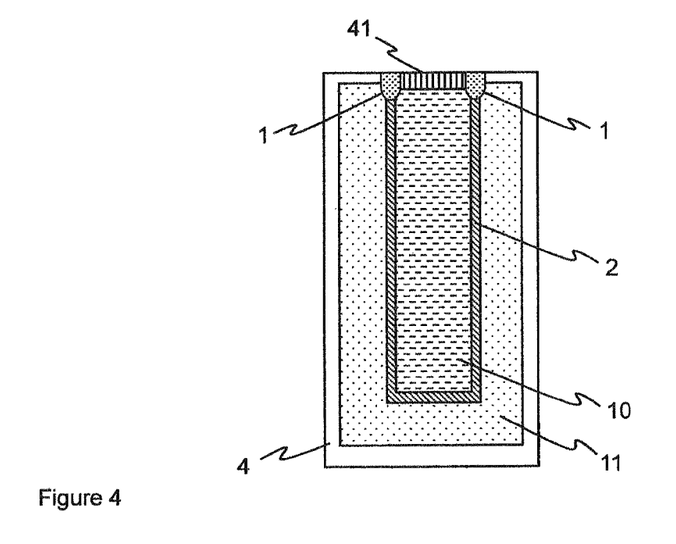
FIG. 4 is a cross-sectional view through another ZEBRA® battery.

FIG. 4 shows an alternative embodiment of the ZEBRA® battery shown in FIG. 3. Since the joining glass (1) creates an electrically insulating joint between the two joining components at the bond between housing (4) and cover (41), it would also be possible to produce the cover (41) as shown in FIG. 4 from a metal or at least an electrically conductive material and to geometrically configure it in such a way that it does not come into contact with the electrolyte (10), such that it is possible to dispense with the led-through electrode (52) and the cover itself then acts as the cathode. The joining glass then bonds in particular the three joining components of housing (4), cover (3) and membrane (2) at one single region, here in the form of a ring.

Figure 5A:
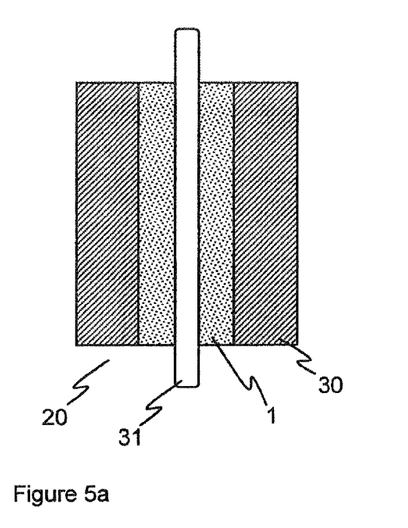
FIG. 5a is a cross-sectional view through a feedthrough-device.

FIG. 5a schematically shows the section through a feedthrough-device (20). This feedthrough-device (20) comprises a carrier element (30), which in this example is represented by a metal cylinder. The carrier element (30) usually has the functionality of the outer conductor. In the described application areas, it usually is made of steel. Advantageous embodiments are made of carbon steel, austenitic steel and/or ferritic steel. For specific application areas, the carrier element (30) might be made of Kovar or a ceramic. The carrier element (30) also comprises a feedthrough opening which connects one side of the carrier element (30) with the other. The functional element (31) is arranged within the feedthrough opening. In this example the functional element (31) is represented by a rod which serves as electric conductor, also named inner conductor. The functional element (31) might be composed of different suitable materials such as Kovar and/or copper and/or alloys, for example NiFe alloys and/or CrNi alloys. The joining glass (1) fixes the functional element (31) within the feedthrough opening in an electrically insulating manner and seals the feedthrough opening at the same time. The joining glass (1) according to the invention provides the feedthrough-device (20) with the advantage that the feedthrough opening can be hermetically sealed. For the production of feedthrough-devices (20), the joining glass (1) is usually fused together with the carrier element (30) and functional element (31), thereby establishing a joint connection between the carrier element (30) and the joining glass (1) and the functional element (31).

Figure 5B:
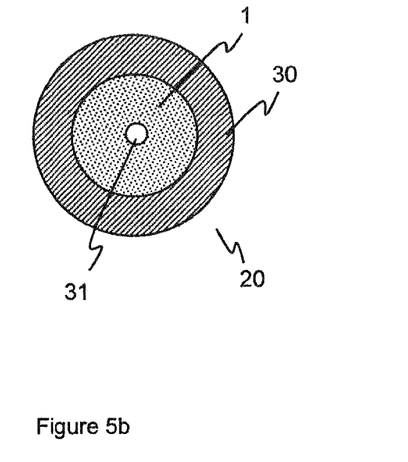

FIG. 5b shows the top view of the feedthrough-device (20) according to FIG. 5a. As can be seen the functional element (31) is arranged concentrically within the feedthrough opening. This geometry is usually applied in compression seals, in which the thermal expansion of the carrier element (30) is larger than the thermal expansion of the joining glass (1). As effect, during the fusion of the joining glass within the feedthrough opening and subsequent cooling the carrier element (30) so to say shrinks onto the joining glass and thereby generates a compressive stress towards the joining glass (1). This compressive stress enhances the mechanical force which is required to push the joining glass out of the feedthrough opening and thereby enhances the mechanical stability of the whole feedthrough-device (20).

The feedthrough-device (20) as shown in FIGS. 5a and 5b represents a typical device of the class of the so called large feedthrough-devices.

Figure 6:
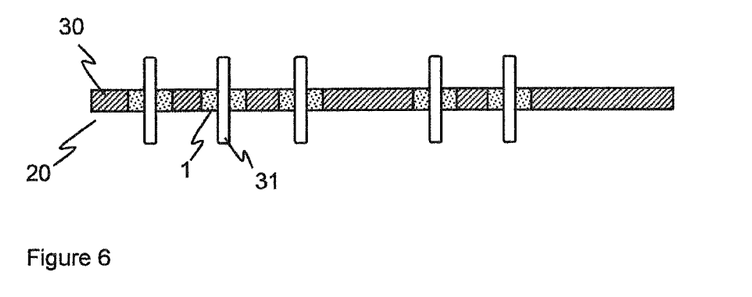
FIG. 6 is a cross-sectional view through an alternative feedthrough-device.

FIG. 6 shows the section through an alternative embodiment of a feedthrough-device (20) with a plurality of access opening within a carrier element (30). This so called planar element has dimensions which are wider than high. The feedthrough openings can be arranged in a matrix. The matrix itself is variable, which means that the location of the feedthrough openings can be chosen according to the desired application. This embodiment can e.g. be used to provide multiple electrical and/or electronic components with electric current, e.g. to power them and/or to lead signals generated by these components through the carrier element (30). The carrier element (30) might or might not seal the housing of a referring device. The carrier element (30) might be manufactured by a metal and/or alloy, or a ceramic, especially the materials described above.

Figure 7:
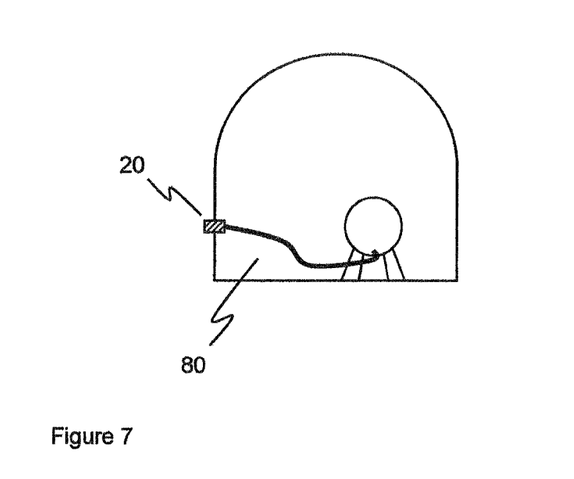
FIG. 7 is a cross-sectional view through the containment of a reactor.

In FIG. 7, the containment (80) of an energy generation device is shown, for example a reactor, specifically a nuclear reactor or an installation for the disposal of toxic waste. Those have to be safely encapsulated within the containment (80), also in emergency and failure state situations. A feedthrough-device (20) according to the present disclosure is advantageously used in order to provide contact with the generator and/or devices within the containment. Such devices are e.g. devices to monitor the operation conditions of the generator and/or to steer the reactor or other devices.

Figure 8:
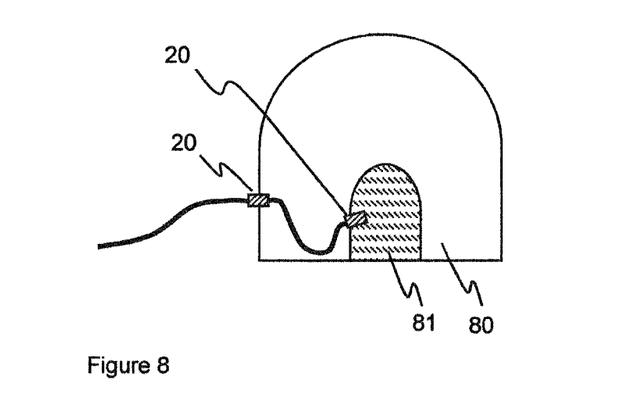
FIG. 8 is a cross-sectional view through the containment of a reactor and the reactor itself.

In FIG. 8, an energy generation device (81) such as a reactor is shown. This schematic illustration also comprises the cooling circuit of the reactor, in case of a fast breeding reactor especially its primary and/or secondary cooling circuit which is operated with liquid sodium as cooling medium. The feedthrough-device (20) can be used to supply steering and/or sensor and/or actuator devices and/or electric motors, especially within electric pumps, with electric current. Furthermore, the containment (80) can be supplied with the feedthrough-device (20) as described in the FIG. 7.

Joining glasses (1) according to the invention were produced in conventional glass-melting processes. The details of glass melting are known to a person skilled in the art and are not repeated at this point.

Table 1 below summarizes compositions and physical properties of four exemplary joining glasses (1) according to the invention, No. 1 to No. 4.

TABLE 1

Examples of joining glasses according to the invention (compositions are in % by weight based on oxide content)

| | No. 1 | No. 2 | No. 3 | No. 4 |
|---|---|---|---|---|
| Composition: | | | | |
| $SiO_2$ | 49 | 44 | 40 | 42 |
| $B_2O_3$ | 26 | 26 | 30 | 26 |
| $Na_2O$ | 8 | 10 | 6 | 15 |
| $Al_2O_3$ | 17 | 20 | 24 | 17 |
| Properties: | | | | |
| $T_g$ [° C.] | 546 | 488 | 548 | 533 |
| Density [g/cm$^3$] | 2.35 | 2.26 | 2.43 | 2.40 |
| $\alpha_{20\text{-}300° C.}$ [$10^{-6}$ K$^{-1}$] | 5.80* | 6.61 | 5.62 | 8.34 |

TABLE 2

Comparative examples of joining glasses (compositions in % by weight based on oxide content)

| | CE 1 | CE 2 |
|---|---|---|
| Composition: | | |
| $SiO_2$ | 69.8 | 68.0 |
| $B_2O_3$ | 15.6 | 13.0 |
| $Na_2O$ | 7.2 | 12.0 |

TABLE 2-continued

Comparative examples of joining glasses (compositions in % by weight based on oxide content)

|  | CE 1 | CE 2 |
|---|---|---|
| $Al_2O_3$ | 5.4 | 5.0 |
| ZnO | 2.0 | 1.0 |
| BaO | — | 1.0 |
| Properties: |  |  |
| $T_g$ [° C.] | 505 | 565 |
| Density [g/cm³] | 2.31 | 2.44 |
| $\alpha_{20-300°\,C.}[10^{-6}\,K^{-1}]$ | 5.2 | 6.7 |

Table 2 shows the composition and physical properties of joining glasses which lie outside the glass composition range according to the invention and as comparative examples are referred to herein below as CE 1 and CE 2.

The glasses of the comparative examples have higher contents of $SiO_2$ and lower contents of $B_2O_3$ and $Al_2O_3$ than the joining glasses according to the invention.

The resistance of the joining glasses according to the invention as shown in Table 1 was determined compared to glasses CE 1 and CE 2 of the comparative examples shown in Table 2. For this purpose, a glass cube consisting of the glass in question is placed with the edge length in a bath of molten sodium at 300° C. for a defined period of time and the sample appearance, the structure of the sample surface and also the loss of mass are determined. All of the joining glasses according to the invention as shown in Table 1 prove to be more resistant than the comparative examples shown in Table 2 or show a higher coefficient of thermal expansion, which results in an improved ability to provide joining connections with metals as joining partner.

The advantage of the joining glasses according to the invention over the prior art lies in the fact that they can be used for producing joints with ceramics and/or metal and also in the improved chemical resistance thereof.

While the invention has been illustrated and described as embodied in a sodium-resistant joining glass and uses thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A joining glass (1) that is free of $ZrO_2$ except for at most impurities and that comprises, in % by weight based on oxide content:

|  |  |
|---|---|
| $SiO_2$ | 40-44 |
| $B_2O_3$ | 26-30 |
| $Na_2O$ | 5-15 |
| $Al_2O_3$ | 17-25 |
| $\Sigma$ MO | 0-<2, | wherein MO represents, individually or in any combination, CaO and/or SrO and/or BaO.

2. The joining glass (1) according to claim 1, additionally comprising, individually or in any combination, in % by weight based on oxide content:

|  |  |
|---|---|
| ZnO | 0-5 |
| $TiO_2$ | 0-5 |
| $SnO_2$ | 0-5 |
| MgO | 0-15. |

3. The joining glass (1) according to claim 1, which has a coefficient of linear thermal expansion $\alpha_{20-300°\,C.}$ in a temperature range of 20 to 300° C. of from $5.5\times10^{-6}\,K^{-1}$ to $10.5\times10^{-6}\,K^{-1}$.

4. The joining glass (1) according to claim 1, which has a coefficient of linear thermal expansion $\alpha_{20-300°\,C.}$ in a temperature range of 20 to 300° C. of from $5.5\times10^{-6}\,K^{-1}$ to $8.5\times10^{-6}\,K^{-1}$.

5. The joining glass (1) according to claim 1, which has a coefficient of linear thermal expansion $\alpha_{20-300°\,C.}$ in a temperature range of 20 to 300° C. of from $6.0\times10^{-6}\,K^{-1}$ to $8.0\times10^{-6}\,K^{-1}$.

6. The joining glass (1) according to claim 1, additionally comprising up to 30% by volume of an oxidic filler for setting or adjusting thermal expansion behaviour, corrosion resistance and/or flow behaviour.

7. The joining glass (1) according to claim 6, wherein the filler is in the form of particles and/or fibres.

8. A joint between a first joining component (2) and a second joining component (3, 4, 41), said joint comprising a joining glass (1),
wherein the joining glass (1) bonds a joining area of the first joining component (2) to a joining area of the second joining component (3, 4, 41);
wherein said joining glass (1) is free of $ZrO_2$ except for at most impurities and comprises, in % by weight based on oxide content:

|  |  |
|---|---|
| $SiO_2$ | 40-44 |
| $B_2O_3$ | 26-30 |
| $Na_2O$ | 5-15 |
| $Al_2O_3$ | 17-25 |
| $\Sigma$ MO | 0-<2; | and
wherein MO represents, individually or in any combination, CaO and/or SrO and/or BaO.

9. The joint according to claim 8, wherein the first joining component (2) comprises a ceramic at least at the joining area thereof and the second joining component (3, 4, 41) comprises a metal and/or a ceramic at least at the joining area thereof.

10. The joint according to claim 9, wherein the ceramic at the joining area of the first joining component (2) and/or at the joining area of the second joining component (3, 4, 41) is selected from the group consisting of alumina, α-alumina, μ-alumina, μ"-alumina and sodium super ionic conductor (NASICON).

11. The joint according to claim 9, wherein the metal of the second joining component (41) has a coefficient of linear thermal expansion $\alpha_{20-300°\,C.}$ which in a temperature range is greater than or equal to a coefficient of linear thermal expansion $\alpha_{20-300°\,C.}$ of the ceramic in said temperature range.

12. A joint between a first joining component (2) and a second joining component (3, 4, 41), said joint comprising a joining glass (1),
wherein the joining glass (1) bonds a joining area of the first joining component (2) to a joining area of the second joining component (3, 4, 41);
wherein the first joining component (2) comprises a metal at least at the joining area thereof and the second joining component (3, 4, 41) comprises a metal at least at the joining area thereof;

wherein said joining glass (1) is free of $ZrO_2$ except for at most impurities and comprises, in % by weight based on oxide content:

| | |
|---|---|
| $SiO_2$ | 40-50 |
| $B_2O_3$ | >25-30 |
| $Na_2O$ | 5-15 |
| $Al_2O_3$ | 17-25 |
| Σ MO | 0-<2; | and
wherein MO represents, individually or in any combination, CaO and/or SrO and/or BaO.

13. The joint according to claim 12, wherein the metal (41) of the second joining component has a coefficient of linear thermal expansion $\alpha_{20\text{-}300°\,C.} > 8\times10^{-6}\,K^{-1}$.

14. An electrochemical energy storage and/or energy generation unit comprising at least one joint according to claim 8.

15. A sodium-sulphur battery or sodium-metal chloride battery comprising at least one joint according to claim 8.

16. An electrical feedthrough-device (20) comprising at least one joint that bonds a joining area of a first joining component (2) to a joining area of a second joining component (3, 4, 41), said joint comprising a joining glass;
wherein said joining glass (1) is free of $ZrO_2$ except for at most impurities and comprises, in % by weight based on oxide content:

| | |
|---|---|
| $SiO_2$ | 40-44 |
| $B_2O_3$ | 26-30 |
| $Na_2O$ | 5-15 |
| $Al_2O_3$ | 17-25 |
| Σ MO | 0-<2; | and
wherein MO represents, individually or in any combination, CaO and/or SrO and/or BaO.

17. An electrical feedthrough-device (20) comprising
a metal carrier element (30) with at least one feedthrough opening, and
a metal functional component (31),
wherein the metal functional component (31) is fixed within the feedthrough opening electrically insulated from the metal carrier element (30) by the joining glass (1) so that the feedthrough opening is sealed;
wherein said joining glass (1) is free of $ZrO_2$ except for at most impurities and comprises, in % by weight based on oxide content:

| | |
|---|---|
| $SiO_2$ | 40-44 |
| $B_2O_3$ | 26-30 |
| $Na_2O$ | 5-15 |
| $Al_2O_3$ | 17-25 |
| Σ MO | 0-<2; | and
wherein MO represents, individually or in any combination, CaO and/or SrO and/or BaO.

18. An installation for disposal of waste, or a nuclear reactor, comprising an electrical feedthrough-device (20) according to claim 17.

19. A method of making a sodium-sulphur battery or a sodium-metal chloride battery comprising the step of hermetically sealing a housing (4) of the battery and/or closing off membrane components (2) of the battery with the joining glass (1) according to claim 1.

20. An electrochemical energy storage and/or energy generation unit comprising at least one joint according to claim 12.

21. A sodium-sulphur battery or sodium-metal chloride battery comprising at least one joint according to claim 12.

22. The installation or nuclear reactor according to claim 18, wherein the nuclear reactor is a breeder reactor.

23. A joint between a first joining component (2) and a second joining component (3, 4, 41), said joint comprising a joining glass (1),
wherein the joining glass (1) bonds a joining area of the first joining component (2) to a joining area of the second joining component (3, 4, 41);
wherein the first joining component (2) comprises a ceramic at least at the joining area thereof and the second joining component (3, 4, 41) comprises a metal at least at the joining area thereof;
wherein said joining glass (1) is free of $ZrO_2$ except for at most impurities and comprises, in % by weight based on oxide content:

| | |
|---|---|
| $SiO_2$ | 40-44 |
| $B_2O_3$ | 26-30 |
| $Na_2O$ | 5-15 |
| $Al_2O_3$ | 17-25 |
| Σ MO | 0-<2; | and
wherein MO represents, individually or in any combination, CaO and/or SrO and/or BaO.

24. The joint according to claim 23, wherein the ceramic at the joining area of the first joining component (2) is selected from the group consisting of alumina, α-alumina, β-alumina, β"-alumina and sodium super ionic conductor (NASICON).

25. The joint according to claim 23, wherein the metal of the second joining component (41) has a coefficient of linear thermal expansion $\alpha_{20\text{-}300°\,C.}$ which in a temperature range is greater than or equal to a coefficient of linear thermal expansion $\alpha_{20\text{-}300°\,C.}$ of the ceramic in said temperature range.

26. An electrochemical energy storage and/or energy generation unit comprising at least one joint according to claim 23.

27. A sodium-sulphur battery or sodium-metal chloride battery comprising at least one joint according to claim 23.

28. An electrical feedthrough-device (20) comprising at least one joint according to claim 23.

* * * * *